No. 736,217. PATENTED AUG. 11, 1903.
A. F. CLARK.
SECONDARY BATTERY PLATE AND METHOD OF MAKING SAME.
APPLICATION FILED DEC. 28, 1901.
NO MODEL. 2 SHEETS—SHEET 1.
Fig. 1.
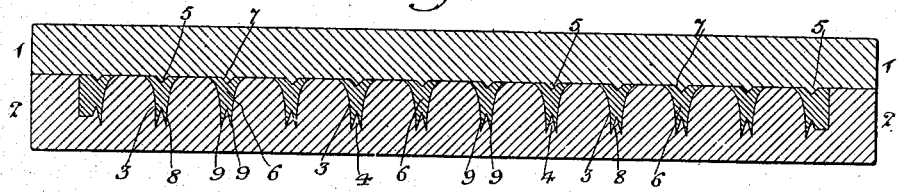
Fig. 2.
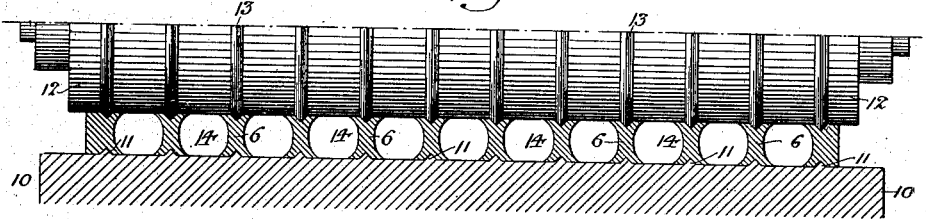
Fig. 3.
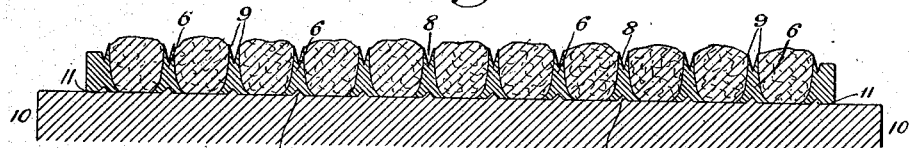
Fig. 4.
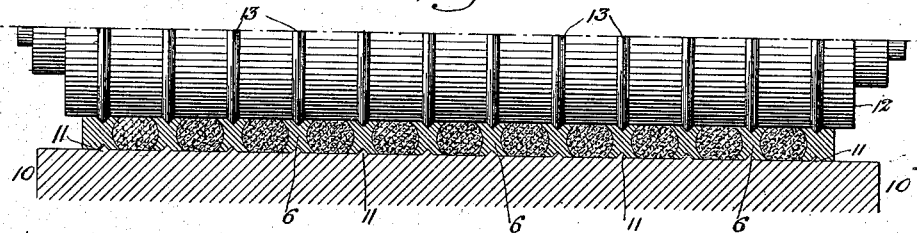
Fig. 5.
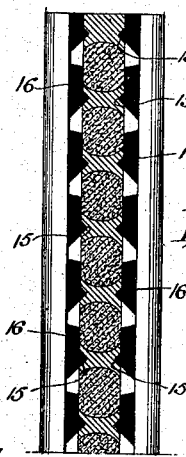
Fig. 6.
Fig. 7.
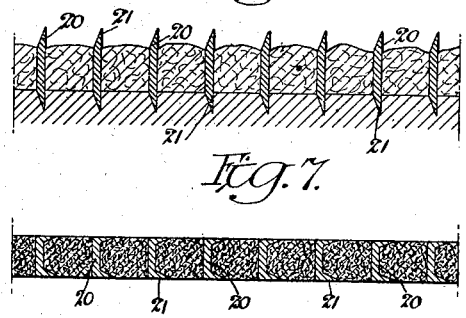
Witnesses:—
Inventor:
Absolam F. Clark,
by his Attorneys,
Howson & Howson No. 736,217. PATENTED AUG. 11, 1903.
A. F. CLARK.
SECONDARY BATTERY PLATE AND METHOD OF MAKING SAME.
APPLICATION FILED DEC. 28, 1901.
NO MODEL. 2 SHEETS—SHEET 2.
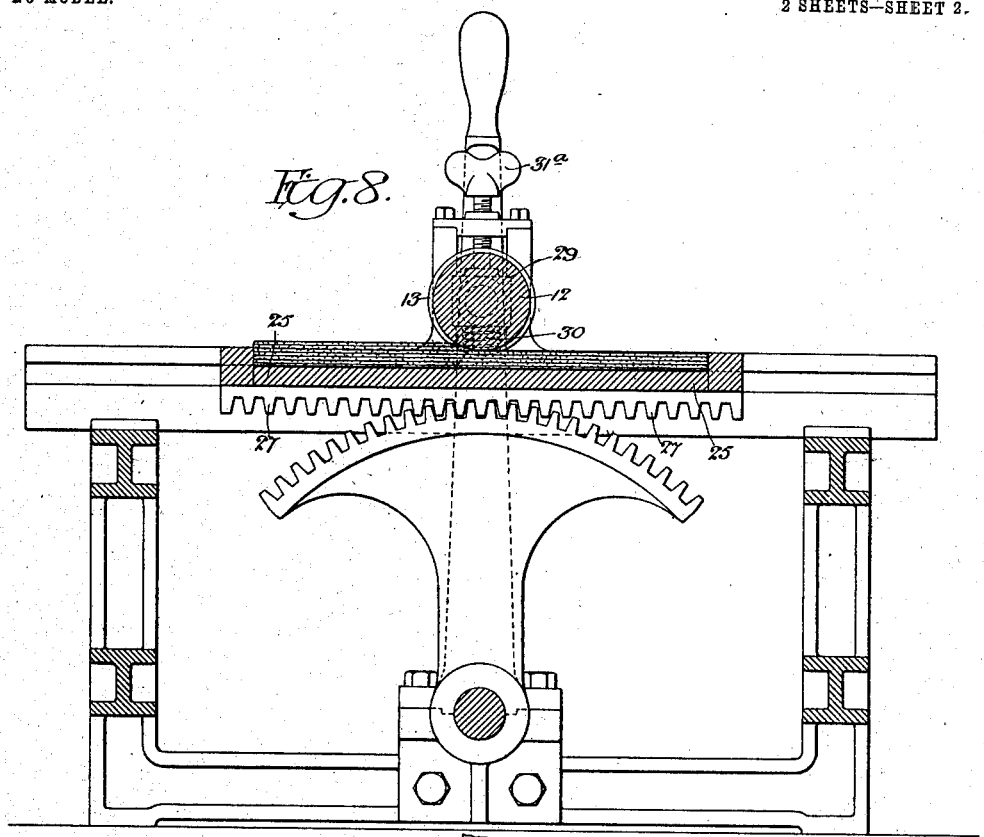
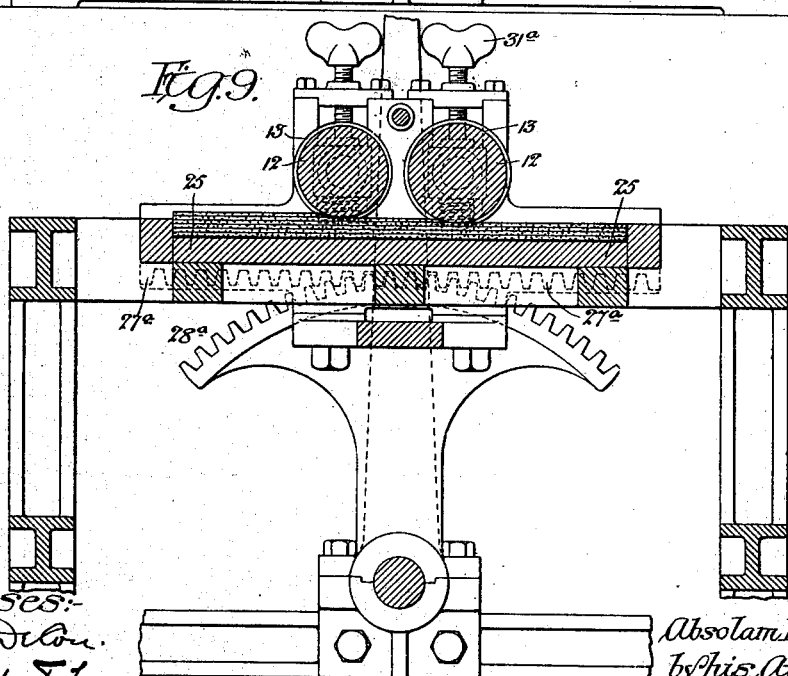

No. 736,217. Patented August 11, 1903.

UNITED STATES PATENT OFFICE.

ABSOLAM F. CLARK, OF PHILADELPHIA, PENNSYLVANIA, ASSIGNOR TO ELECTRIC VEHICLE EQUIPMENT COMPANY, OF PHILADELPHIA, PENNSYLVANIA, A CORPORATION OF PENNSYLVANIA.

SECONDARY-BATTERY PLATE AND METHOD OF MAKING SAME.

SPECIFICATION forming part of Letters Patent No. 736,217, dated August 11, 1903.

Application filed December 28, 1901. Serial No. 87,559. (No model.)

*To all whom it may concern:*

Be it known that I, ABSOLAM F. CLARK, a citizen of the United States, residing in Philadelphia, Pennsylvania, have invented certain Improvements in Secondary-Battery Plates and in the Methods of Making the Same, of which the following is a specification.

My invention relates to that class of secondary or storage battery plates in which the grid is formed under pressure, the object of my invention being to so form the grates of the grid that they may be readily removed from the mold and at the same time shape them to be used with a special form of supporting-separator.

A further object of my invention is to so shape the grates that in their original shape the active material will be confined by one side of the same; and a still further object of my invention is to finish the grates of the grids by pressing a portion of such grate on either side of the same, thereby forming with the opposite faces of the grates inclosures for the active material, which active material may also be subjected to pressure at the same time the grates are compressed.

My invention is fully illustrated in the accompanying drawings, in which—

Figure 1 represents a sectional view of a mold in which my improved plate is formed under pressure, such plate being shown therein also in section. Fig. 2 is a view illustrating a further step in the method or process of forming the plates. Fig. 3 is a sectional view showing a plate as it comes from the mold with the spaces between the grates filled with the active material. Fig. 4 is a view similar to Fig. 2, showing the active material pressed into the plate. Fig. 5 is a sectional view of a finished plate filled with the active material and combined with a form of separator which I prefer to use in connection with this improved form of plate and which is described and claimed in my application for Letters Patent filed July 22, 1901, Serial No. 69,254. Figs. 6 and 7 are views illustrating a plate having a modified form of grate. Fig. 8 is a view of one form of apparatus for giving my plates the necessary pressure after they have been removed from the mold, and Fig. 9 is a similar view illustrating another form of pressure apparatus.

When molding lead battery-plates under pressure, it is necessary that the grates of the grid be given a taper in order that said plate may be readily removable from the mold. Such construction alone, however, would not be practicable in forming a battery-plate, for the reason that the active material would be in the shape of a wedge and the reduction of such plate by electrolytic action when giving off an electrical current would cause such an expansion as to force such active material out of the spaces between the grids. My improved plate is designed in such manner that it may be readily removed from the mold and after being passed through a suitable pressure apparatus, either before or after the active material has been put in the same, it will be in condition to firmly retain such active material in place.

In the drawings herewith, 1 and 2 represent the upper and lower portions of the mold, the lower portion having recesses 3 with tapered walls, which serve to form the grates of the grid, and wedge-shaped longitudinal projections 4, located in the bottom of the recesses 3. The upper plate 1 of the mold carries wedge-shaped lugs or ribs 5, which are directly above the recesses of the lower plate.

When cast in such a mold as described, the plates will have grates 6 substantially wedge-shaped in cross-section, each with a shallow wedge-shaped groove 7 at the wider end of said grate and a deeper wedge-shaped groove 8 at the thinner end of said grate, with two wings or wedge-shaped projections 9 adjacent to the latter groove. Although I wish to make the grooves wedge-shaped, I do not wish to restrict myself to straight faces on said wedge-shaped portions, as I may prefer to have them slightly concave, as illustrated in Fig. 1 of the drawings. After the plate has been cast it is removed from the mold and placed upon a suitable bed 10, having ribs 11 to engage the grooves 7 of each grate, and over said plate a roller 12 is passed, having V-shaped ribs 13, adapted to enter the deep V-shaped grooves or recesses 8 of the narrow end of the grates of the grid and press down the wedge-shaped sides 9 of this part of the grates to the shape shown in Fig. 2. By this means inclosures 14, having retaining walls or supports, are provided for the active material, and said active material may be introduced into the spaces between the grates of the grid either before said grates are flattened down or afterward. When the plate is finished, as just described, it will have a series of grates with side walls or retaining portions for the active material and grooves running lengthwise of such grates for the engagement of the ribs of the separator described in my application above referred to and which is shown herewith at Fig. 5, the supports engaging the grates being indicated at 15, while the supporting-ribs for such grate-supports are shown at 16.

I have discovered that the efficiency of the plate may be greatly increased if the active material is pressed into the spaces or inclosures 14 of the grid between the grates, and in Fig. 3 I have shown a plate as it comes from the mold, filled with the active material. In this condition the active material is comparatively porous and should be disposed so that its upper surface is on an approximate level with the upper edge of the grates. In Fig. 4 this plate is shown in the act of being compressed by a roller for the double purpose of turning down the wings or extensions 9 of the grates to form the inclosures for the active material and also to insure the pressing of such active material between said grates. A plate made in accordance with this portion of my invention will last for a considerable length of time, and by using the improved supporting-separator which I have described there is absolutely no danger of the active material breaking away.

In Figs. 6 and 7 I have shown a modified form of grate-section for use in connection with a plate forming the subject of my invention. In this form of plate the grates are simply perpendicular members 20, having the beveled or wedge-shaped edges 21, which are to be turned down in a manner similar to the spreading of the grates of the plate illustrated in Figs. 1 and 2. Fig. 7 shows a plate having a grid of the character illustrated in Fig. 6, showing the edges of the grates of such grid bent over to inclose the active material. By preference I propose to employ a roller having suitable annular ribs or grooves, as may be desired, for the purpose of pressing down the edges of the grates, so that they will inclose the active material disposed between such grates. Rolling pressure is quite essential for the form of grate shown in Fig. 6; but in some instances I may provide an ordinary ribbed plate to fit the grooves of the plate shown in Figs. 1 and 2 and then place such plate together with the base or supporting-plate for the grate and put direct pressure upon the upper plate to press the grates of the grid into the desired shape.

In Fig. 8 I have shown one form of apparatus for pressing the plates by rolling down the grates of the same. In this device 25 represents a suitable platen upon which the grate or grid is supported, such platen having a rack 27, with which a gear-segment 28 meshes, movement being imparted to the latter by means of a suitable hand-wheel. In lieu of this mechanism power-driven gearing may be employed to reciprocate the platen. Mounted above said platen is the roller 12, having the ribs 13 to engage the edges of the grates, and this roller is supported in journals 29, resting upon springs 30, so that the normal tendency of said roller is to lift itself from the plate under treatment. It is essential that the rolling be effected gradually, and for this purpose I provide the journals of the roller with adjusting-screws 31, so that said roller may be lowered onto the plate as the latter is moved back and forth beneath the same. By this means the gradual shaping of the grates is effected and at the same time a greater compacting of the grates of the grid, as well as the active material, is assured.

Instead of a single roller adjustably mounted I may employ a series of rollers to act upon the plate, each succeeding one being arranged closer to the upper surface of such plate, whereby a gradual pressing of the plates may be insured. I may also instead of moving the plate upon a platen into contact with a fixed roll employ a fixed bed over which one or a number of rollers may be passed, and in Fig. 9 I have shown a pair of movable rollers arranged to be moved over a fixed platen carrying the plate to be pressed. These rollers are mounted in a suitable frame having a rack $27^a$, with which a gear-segment $28^a$ meshes in order that said rack may be moved. These rollers are adjustable in their bearings and have adjusting set-screws $31^a$.

Having thus described my invention, I claim and desire to secure by Letters Patent—

1. As a new article of manufacture, a grid-blank for secondary or storage batteries cast under pressure and having wedge-shaped grates with grooves extending longitudinally of the same, the grooves on one side of said grates having projecting wedge-shaped walls to be subsequently reduced by pressure.

2. As a new article of manufacture, a grid-blank for secondary or storage batteries having wedge-shaped grates or bars forming spaces for the reception of the active material, said grates or bars having grooves extending longitudinally of the same, the grooves on one side of said grates having projecting wedge-shaped walls to be subsequently reduced by pressure, and the grooves on the opposite side of said grates being finished in the casting operation.

3. As a new article of manufacture, a grid-blank for secondary or storage batteries cast under pressure and having wedge-shaped grates with concave inner walls, said grates having grooves extending longitudinally of the same, the grooves on one side of said grates being formed in the casting operation, while the grooves on the opposite side of said grates have projecting walls to be subsequently reduced by pressure.

4. As a new article of manufacture, a grid for use with secondary or storage batteries formed of metal cast under pressure and having when cast a series of grates each having a shallow groove on one side and a deep groove on the other, said grates being subsequently subjected to pressure for the purpose of reducing the metal adjacent to the deep groove of the same whereby it may be brought into position to support the active material disposed between the grates of the grid.

5. The method of forming grids for use with secondary or storage batteries, said method consisting in first casting the grid with the grooves on both faces of the grates, and then reducing the metal adjacent to one set of the grooves by pressure whereby the metal may be disposed so as to form a wall or support for the active material and the grooves on each face of the grid made substantially the same width and depth.

6. The method of forming grids for use with secondary or storage batteries, said method consisting in first casting the grid with grooves on both faces of the grates, and then reducing the metal adjacent to one set of the grooves by passing a roller over the same whereby the metal may be disposed so as to form a wall or support for the active material and the grooves on each face of the grid made substantially the same width and depth.

In testimony whereof I have signed my name to this specification in the presence of two subscribing witnesses.

ABSOLAM F. CLARK.

Witnesses:
MURRAY C. BOYER,
JOS. H. KLEIN.